UNITED STATES PATENT OFFICE.

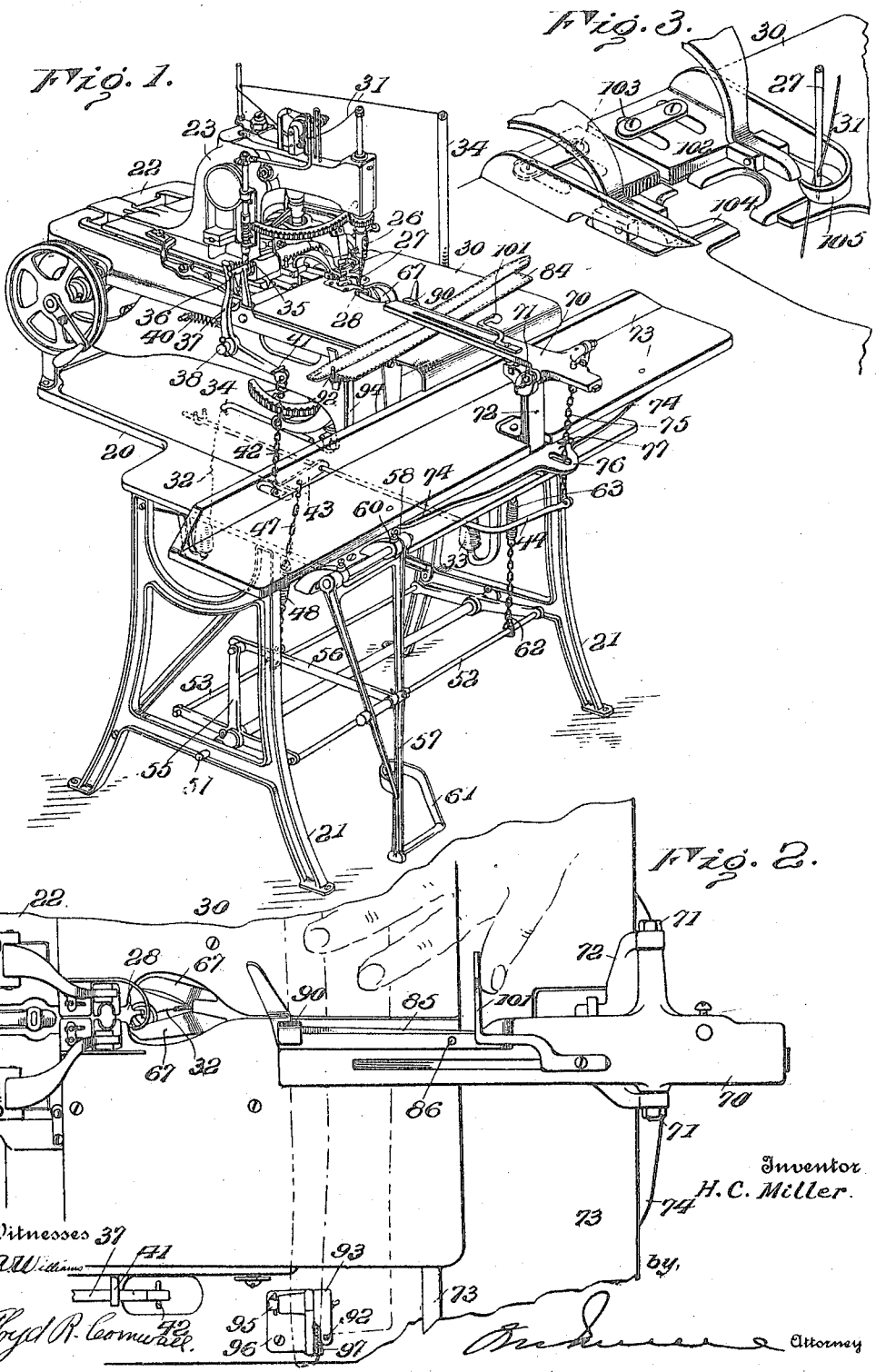

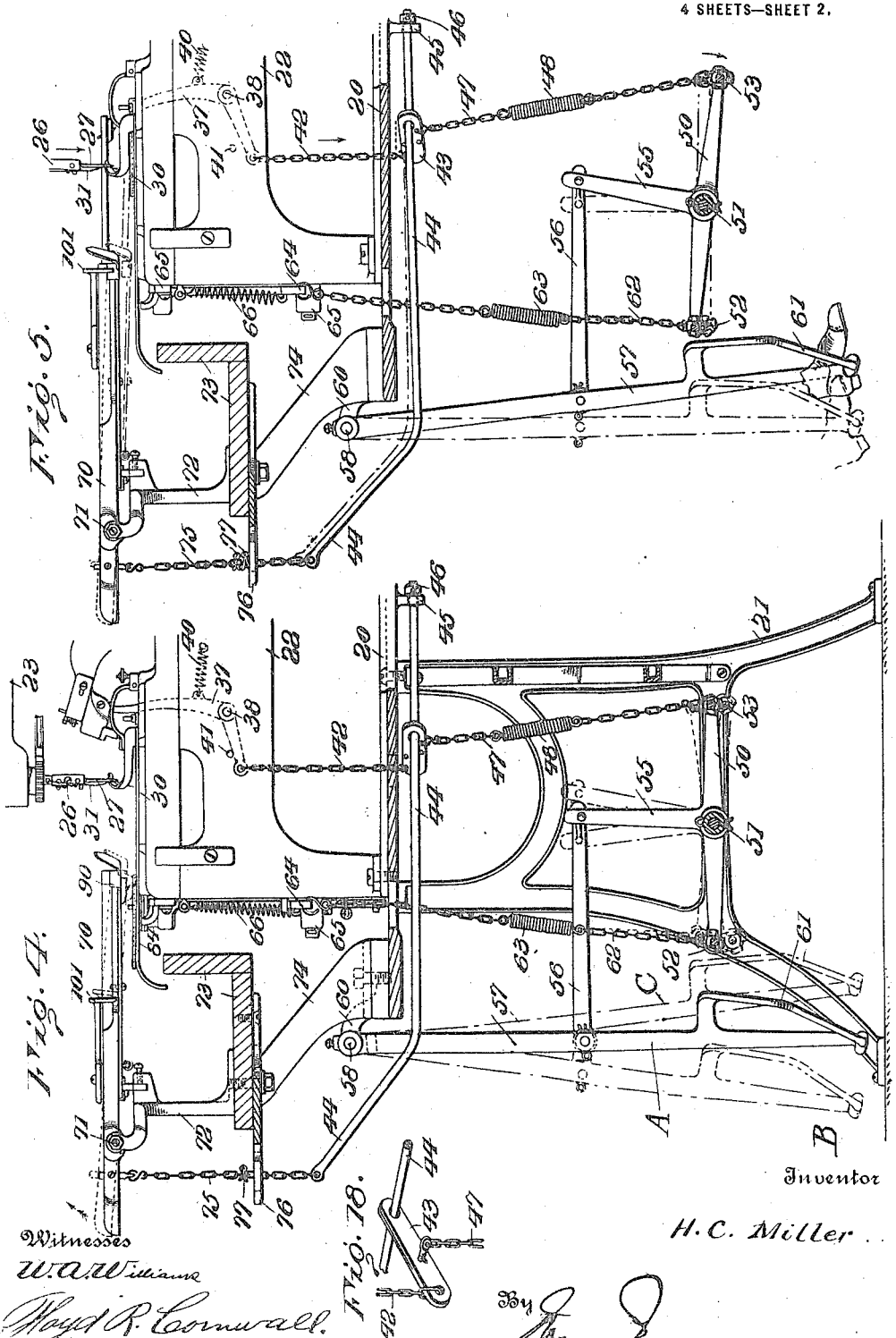

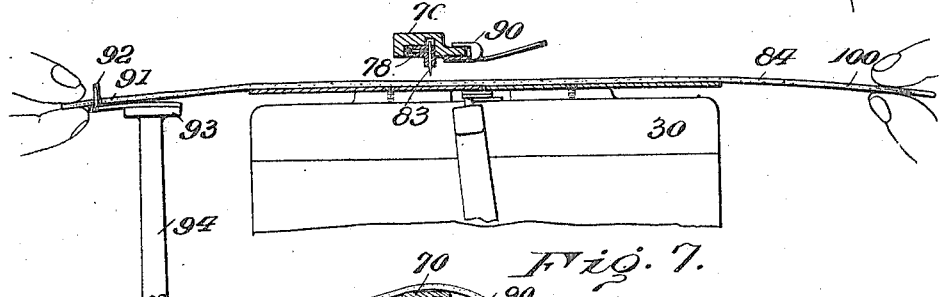
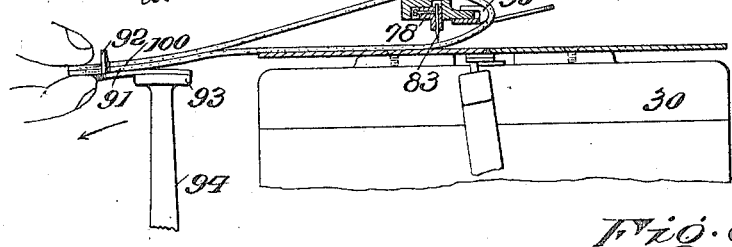
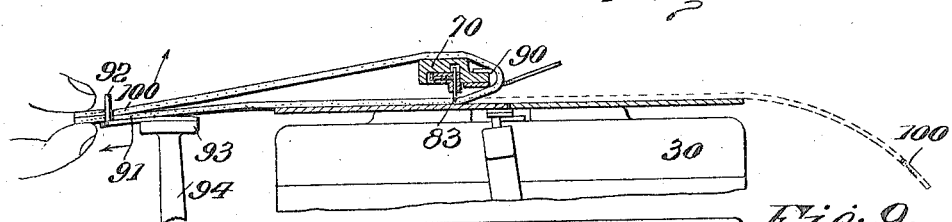
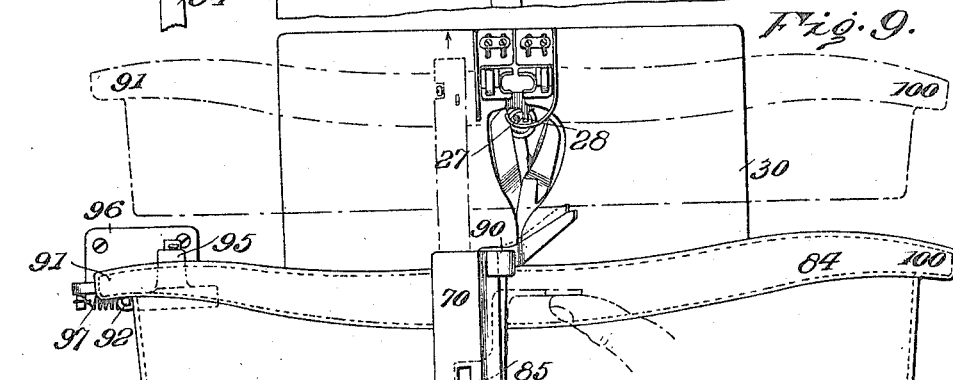

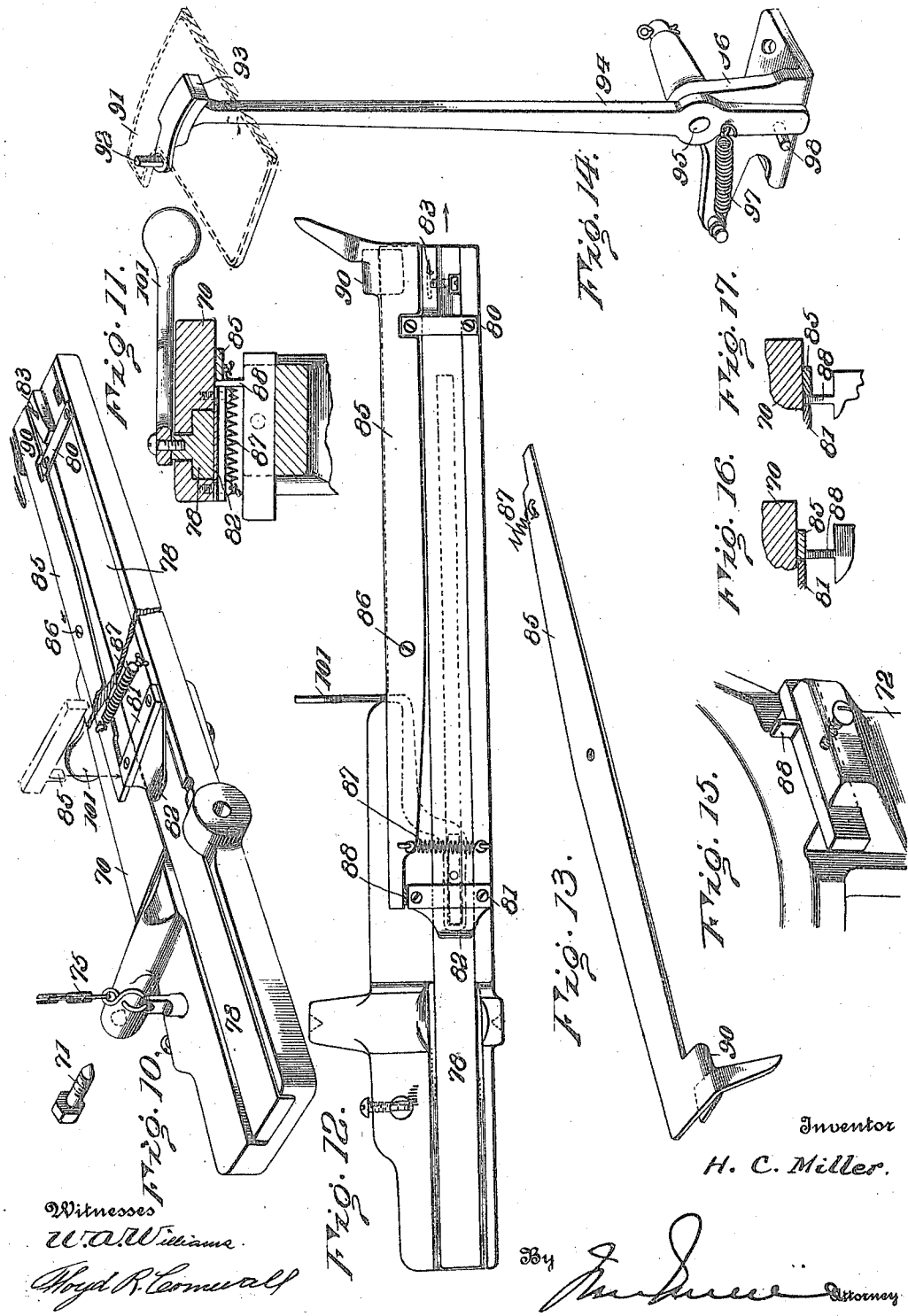

HENRY C. MILLER, OF WATERFORD, NEW YORK.

BUTTONHOLE-MACHINE.

1,257,912.  Specification of Letters Patent.  Patented Feb. 26, 1918.

Application filed June 5, 1914. Serial No. 843,301.

*To all whom it may concern:*

Be it known that I, HENRY C. MILLER, citizen of the United States, residing at Waterford, in the county of Saratoga and State of New York, have invented certain new and useful Improvements in Buttonhole-Machines; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to improvements in button hole machines, and with regard to certain more specific features thereof, to improvements in mechanism for centering the rear button hole in collars while being formed, although it is, of course, to be understood that certain features of the mechanism are applicable to other machines and other purposes, as for example the proper spacing of button holes in garments.

One of the objects of the present invention is to provide a simple and practical mechanism of the above character particularly adapted for properly centering the rear button hole in collars.

Another object of the invention is to provide mechanism having relatively few parts which will be cheap to manufacture and install.

A further object is to provide mechanism of the first above mentioned character in which the button holes may be more rapidly, efficiently and accurately placed in collars.

A further object is to provide mechanism which will permit a great saving of time and allow the operator to more carefully place his work while the machine is working upon a previously placed article.

A further object is to provide mechanism adapted to operate upon collars of various sizes without alteration and adjustment.

Other objects will be in part obvious and in part hereinafter pointed out.

The invention accordingly consists in certain features of construction, combination of elements, and arrangement of parts which will be exemplified in the following specification and the scope of which will be indicated in the accompanying claims.

In the accompanying sheets of drawing wherein is shown one of various possible embodiments of the present invention,—

Figure 1 denotes a perspective view of the complete machine showing a collar about to be operated upon.

Fig. 2 is an enlarged detail plan view showing certain parts in the position shown in Fig. 1.

Fig. 3 is a detail perspective view of a portion of the gage and presser foot.

Fig. 4 is a side elevation, partly in section, of such parts of the machine in normal position as are necessary to understand the present invention.

Fig. 5 is a similar view showing the parts in actuated position.

Figs. 6, 7, and 8 are semi-diagrammatic detail views showing the steps performed in the proper gaging of a collar.

Fig. 9 is a plan view with the parts in normal position and also showing in dotted position a collar in position about to be operated upon.

Fig. 10 is a detail perspective view showing the underside of the work gage.

Fig. 11 is a transverse sectional view of the work gage.

Fig. 12 is a plan view of the work gage.

Fig. 13 is a detail perspective view of the trigger.

Fig. 14 is a detail perspective view showing a transverse stop or a co-acting portion of the work gage.

Fig. 15 is a perspective view of the trigger release mechanism.

Figs. 16 and 17 are detail sectional views of a portion of the trigger and release mechanisms in normal and actuated position respectively.

Fig. 18 is a detail perspective view.

Similar reference characters denote corresponding parts in the various views of the drawings.

Referring now to these drawings in detail and more particularly to Fig. 1 showing the complete machine in perspective 20 denotes the table or frame of the machine supported on suitable legs 21, adapted to be secured to the floor. The upper rear part of this table carries an auxiliary support 22, upon which is mounted a sewing machine head 23, of any desired type, the one shown is the Reece.

As this sewing machine specifically forms no part of the present invention, except in so far as it may enter broadly into certain combinations hereinafter claimed, carrying a revolving and reciprocating head 26, provided with a needle 27, and coöperating sewing mechanism to reciprocate through an opening 28 (Fig. 2) in the rear central part of a work table 30. A thread 31 is carried thereby which coacts with an under thread 32 and a reinforcing thread 33, mounted in suitable bobbins on the underside of the table 20. Both of these threads are conducted through suitable guides and pipes 34 to the point of operation.

Associated with the head 23 as shown in Fig. 1 is a start and stop mechanism 35, which may be of any desired type and is, therefore, not shown in detail. It is sufficient to state that a laterally projecting trip 36 is adapted to be engaged by the upper arm of a bell crank lever 37, pivotally mounted at the point 38 and held in normal position by means of a spring 40. The lower arm of this bell crank lever coacts with a stop 41 and is connected by means of a flexible member or chain 42 (Fig. 4) with the free end of a link 43 (Fig. 18), the opposite end of which is mounted in a rod 44 extending fore and aft of the machine in suitable bracket 45. The rear end of this rod is provided with a stop nut 46 to prevent longitudinal movement. Intermediate the ends of the link 43 is connected a second chain 47 provided with a take-up spring 48, the lower end of which is connected with the rear arm 50 of a double bell crank lever mechanism.

This mechanism as shown perhaps more clearly in Fig. 1, comprises a centrally disposed transverse shaft 51 and front and rear shafts 52 and 53 respectively, and parallel therewith. An upwardly projecting arm 55 from the shaft 51 is connected by means of a link 56 with a suspended treadle or foot lever 57. This lever is pivoted at the point 58 on a bracket 60, mounted upon the table 20, and carries at its lower end a stirrup 61 whereby it may be moved fore and aft from a normal central or intermediate position as shown clearly by dotted lines in Fig. 4.

The forward transverse shaft 52 is connected by means of a chain 62 provided with a compensating spring 63 to a lever 64 mounted upon a boss 65 held in normal position by means of a spring 66. This lever is connected by intermediate mechanism extending rearwardly of the machine below the work table 30 adapted to operate trimmer knives 67 positioned below the opening 28 in the central part of the table 30, through which the stitching needle 27 reciprocates.

From the above described mechanism it will be seen that when the parts are in normal position as shown by full lines A in Fig. 4, the machine is inactive. A movement of the stirrup 61 rearwardly will rock the double bell crank lever mechanism to the position shown by the dotted lines C, causing a downward movement of the shaft 53 and intervening mechanism to actuate the starting trip 36 and permit the needle to perform its stitching functions. Upon completion of the button hole the treadle 61 is drawn forwardly by the foot of the operator to the dotted line position B which stops the stitching mechanism by the return of the bell crank lever 37 to normal position under action of the spring 40 and simultaneously lowers the shaft 52 and intervening mechanism to actuate the trimming mechanism 67 for severing the threads adjacent the button hole.

Coöperating with this mechanism above described is a suitable gage for positively insuring the proper location of the button hole in the exact center of the collar. This gage comprises two independently movable but coacting groups of elements, one of which is shown in detail in Fig. 14 and is adapted to receive the ends of the collar while the other is shown more clearly in Figs. 10, 11, and 12, and coacts with the central part of the collar.

This latter mechanism, which will be described first, comprises a lever 70 pivotally mounted intermediate its ends in suitable trunnion 71 carried at the upper end of a bracket 72 which is in turn carried by a hopper 73 supported at its ends by brackets 74 carried by the table 20. The forward end of this lever 70 is connected by means of a flexible link or chain 75 passing through a guide 76, the lower end of which chain is connected to the rod 44. A cotter pin or stop 77 passing through the chain above the guide 76 limits its downward movement. This connection permits the lever to be rocked about its pivotal support 71 as the starting and stopping mechanism is actuated by the foot lever. The rear end of this lever, shown perhaps more clearly in Fig. 10 is provided with a telescopic sliding part or member 78 held in place by transverse members 80 and 81, one of which 81 carries a spring clutch 82 bearing on the slide with some slight degree of friction to hold it in any position to which it is moved. The forward underside of the slide carries a gripping device in the form of a pin 83 adapted to stick into a collar 84 (Fig. 4) as the lever is rocked.

At one side of the lever 70 is mounted a trigger 85, shown in detail in Fig. 13, adapted to turn about a center or pivot 86 as the same is tripped. A spring 87 normally holds the front end of this trigger inwardly. An adjustable stop member 88 or trigger release as shown more clearly in Fig. 15, normally engages the underside of this trigger 85 as shown in Fig. 16, and as the trigger is actuated during the gaging of the collar at its rear curved end 90 its forward end is moved away from the transverse stop 81 against the action of the spring 87 and the lug 88 slips in therebetween as shown in Fig. 17 and permits the lever 70 to drop to its dotted line position as shown in Fig. 4. This tripping of the trigger is automatic with the adjusting of the collar as will now appear.

Referring now to Figs. 5, 6, and 7, the collar is moved upwardly from the hopper 73 against the underside of the lever 70 and moved rearwardly toward the gripping pin 83 carried by the slide 78 until the left end button hole tab 91 engages over an upwardly projecting lug 92 carried at one side of a plate 93 mounted on a lever 94. The lower end of this lever is pivotally mounted at 95 (Fig. 14) in a bracket 96 secured to the table 20 and is held in normal position by a spring 97 connected with the lower portion of the lever to hold it against a stop 98. After placing the collar in position as shown in Fig. 6 the right hand end of the collar is swung upwardly and over the lever 70 until the right hand tab or end 100 registers with the left hand end 91 against the lug 92 as shown clearly in Fig. 7.

The ends of the collar are then pulled toward the left as indicated in Fig. 8 which causes the lever 94 to swing slightly against the action of the spring 97 and thereby draws the collar tight about the end 90 of the trigger on the lever 70. As this pressure is increased the middle of the collar coacting with the rear end 90 of the trigger 85 as shown in Fig. 12, causes the trigger to swing about the pivot 86 and separate its forward end from the transverse stop 81 and allow the lug 88 to enter therebetween and permit the lever to drop about its pivot to its dotted line position. As the lever drops the pin 83 carried by the rear end of the slide engages a predetermined point on the collar with respect to its center. The slide 78 is then moved rearwardly by means of a handle 101 and carries the collar into operative position with respect to the stitching needle 27. The lower or rear edge of the collar coacts with an adjustable block 102 (Fig. 3) the position of which may be determined by means of set screws 103. The presser foot mechanism 104, is automatically raised and lowered with the stopping and starting of the machine. A guide 105 preferably surrounds the needle and prevents contact therewith by the rear end of the slide 78.

The operation and manner of using the machine will appear clear from the above description, but a brief statement thereof is as follows:—

The operator takes a bundle of collars, usually twenty-four, and places them in the hopper 73 and after snipping the binding string takes the top collar and moves it upwardly and rearwardly against the underside of the gage lever 70 until its left hand end 91 coacts with the laterally moving portion 92 of the gage, as clearly shown in Fig. 1. The right hand end 100 of the collar 84 is then moved over the top of the gage lever until it registers with the left end portion as shown in Fig. 7, and is then pulled with a sufficient degree of pressure toward the left as shown in Fig. 8 to actuate the trigger mechanism, permitting the lever to drop to the dotted line position as shown in Fig. 4. This step securely grips and holds the collar with respect to the slide and just before or simultaneously with the rearward movement of the foot lever 61 to the position shown by dotted lines C, the slide is moved rearwardly by means of a handle 101 which places the collar in operative position with respect to the needle 27 as shown in dotted lines in Fig. 9 and the machine starts. Simultaneously with the starting of the machine the presser foot mechanism 104 drops to hold the collar in position, and the slide 78 is returned to normal position to gage the next collar. On completion of the stitching the button hole the foot lever is moved forwardly to the dotted line position B which stops the stitching mechanism and actuates the trimmer 67 to cut the threads about the collar. The second collar, having previously been gaged, during the stitching operation is immediately moved forward by the slide and the operation repeated. In this manner a great saving of time is accomplished as the stitching of the collar is done automatically while the operator is gaging the next collar. Of course after the collar has been sewed, it is thrown to one side and the gage slide carrying the next collar is moved forwardly.

It is thus seen that the present invention provides a simple and practical machine which is substantially automatic in its operation and permits a much larger output than heretofore accomplished. The mechanism comprises few parts which are relatively cheap to manufacture and install, and in short is believed to accomplish among others, all the objects and advantages set forth.

As many changes could be made in construction of the above device without departing from the scope of the invention it is intended that all matter contained in the above description as shown in the accompanying drawings shall be interpreted as illustrative and not in a limiting sense.

What is claimed is—

1. In a button hole sewing machine in combination, a work support, a collar gage comprising a pivoted support and a slidable collar engaging element so mounted therein, and a trip actuated when gaging the collar to permit the support to rock on its pivot, and means for limiting the movement of the gage.

2. In a buttonhole sewing machine in combination, a frame, a stitching mechanism operatively associated therewith, a gage having a pivoted and sliding movement, an auxiliary gage at one side of the first mentioned gage, the collar being folded around the first mentioned gage and its ends being gaged by the auxiliary gage, means for securing the collar to the first mentioned gage after being folded, and means for starting the stitching mechanism and releasing the gage from the gaged collar.

3. In a buttonhole sewing machine in combination, a work support, a stitching mechanism operatively associated therewith, a pivoted gage positioned above the said work support and slidably toward and from the stitching mechanism, an auxiliary gage at one side of the first mentioned gage, the collar being folded around the first mentioned gage and its ends being engaged by the auxiliary gage, means for securing the collar to the first mentioned gage after being folded, and means for limiting the relative sliding movement of the first mentioned gage.

4. In a button hole sewing machine in combination, a work support, a stitching mechanism operatively associated therewith, a pivoted gage positioned above the said work support movable toward and from the stitching mechanism, said gage having a latch controlled by the collar, and means for limiting the movement of said gage, said means comprising an adjustable abutment positioned upon the work support.

5. In a buttonhole sewing machine in combination, a work support, stitching mechanism operatively associated therewith, a gage support, a pivotally mounted telescopic gage positioned above said work support and gage support including a collar engaging device and a trip normally resting on the gage support to normally hold the device out of contact with a collar, and means for operating said gage, the trip being released by pull on the collar when gaging same to cause the device to engage the collar.

6. In a buttonhole sewing machine in combination, a work support, stitching mechanism operatively associated therewith, a pivotally mounted telescopic gage positioned above the said support and provided with a collar engaging device, means for operating said gage, and an auxiliary gage at one side of the first mentioned gage and against which the ends of the collar are engaged, pull on the collar when gaged causing the engaging device to fasten the collar to the first mentioned gage.

7. In a button hole sewing machine in combination, a work support, stitching mechanism operatively associated therewith, a telescopic gage positioned above said support, means for operating said gage, and an auxiliary gage at one side of first mentioned gage, said auxiliary gage being pivotally mounted to have lateral movement adapted to engage collars of various sizes.

8. In a button hole sewing machine in combination, a work support, stitching mechanism coacting therewith, a gage positioned above said support about which a collar is adapted to be folded, and an abutment at one side of said gage adjacent which the opposite ends of said collar are adapted to be registered.

9. In a button hole sewing machine in combination, a work support, stitching mechanism associated therewith, a member movable relatively to said stitching mechanism and having a predetermined relation with respect to the center of a collar, and means to one side of said member adapted to aid in registering the opposite ends of said collar when folded about said member.

10. In a button hole sewing machine in combination, a work support, stitching mechanism associated therewith, a telescopic member adapted to have a predetermined movement with respect to said stitching mechanism, gripping means associated with said telescopic member adapted to coact with the collar and carry same into operative relation with the stitching mechanism as the effective length of the telescopic member is changed, and means to one side of said telescopic member adapted to aid in registering the opposite ends of said collar when folded about said member.

11. In a button hole sewing machine in combination, a stitching mechanism associated therewith, a pivotally mounted telescopic lever adapted to have a movement toward and from said stitching mechanism, a gripping mechanism on one of the members of said telescopic lever adapted to engage a collar to carry it into operative relation with said stitching mechanism.

12. In a button hole sewing machine in combination, a stitching mechanism associated therewith, a pivotally mounted telescopic lever adapted to have a movement toward and from said stitching mechanism, a gripping mechanism on one of the members of said telescopic lever adapted to engage a collar when carried into operative relation with said stitching mechanism, and means at one side of said lever adapted to aid in registering the opposite ends of said collar for determining the center line thereof.

13. In a button hole sewing machine in combination, a stitching mechanism associated therewith, a pivotally mounted telescopic lever adapted to have a movement toward and from said stitching mechanism, a gripping mechanism on one of the members of said telescopic lever adapted to engage a collar when carried into operative relation with said stitching mechanism, means at one side of said lever adapted to aid in registering the opposite ends of said collar for determining the center line thereof, means for stopping and starting the stitching mechanism, and means adapted to move said lever upon its pivotal support during the starting of the stitching mechanism.

14. In a button hole sewing machine in combination, a work support, stitching mechanism associated therewith, a pivotally mounted gage positioned above said work support, gripping means carried by said gage adapted to coact with a collar when placed in operative relation thereto, an auxiliary gage, and means for actuating said gripping mechanism during the gaging of the collar.

15. In a button hole sewing machine in combination, stitching mechanism, a work support adjacent said mechanism, a member having a fixed position with respect to the stitching mechanism for determining the center line of a collar, a gage at one side of said member adapted to aid in registering the opposite ends of a collar when folded about said member, a second member telescoping said first member and at one side of its center line, gripping mechanism associated with said second member adapted to coact with the collar while being gaged, and means for moving said second member relatively to said stitching mechanism.

16. In a button-hole sewing machine in combination, stitching mechanism, a work support adjacent said mechanism, a member having a fixed position with respect to the stitching mechanism for determining the center line of a collar, a gage at one side of said member adapted to aid in registering the opposite ends of a collar when folded about said member, a second member telescoping said first member and at one side of its center line, gripping mechanism associated with said second member adapted to coact with the collar while being gaged, and means for moving said second member to and from said stitching mechanism, said auxiliary gage having a lateral movement with respect to the said first mentioned member thereby to accommodate collars of different sizes.

17. In a button hole sewing machine in combination, a stitching mechanism, a work support, a centering device comprising a plurality of telescopic members, one of said members being provided with gripping means for carrying a collar into operative relation with respect to said stitching mechanism, and means to one side of said centering device adapted to aid in registering the opposite ends of said collar when folded about said centering device.

18. In a button hole sewing machine in combination, a stitch-mechanism, a work support, a centering device comprising a plurality of telescopic members, one of said members being provided with gripping means for carrying a collar into operative relation with respect to said stitching mechanism, and means for arresting the movement of said centering device, and means to one side of said centering device adapted to aid in registering the opposite ends of said collar when folded about said centering device.

19. In a button hole sewing machine in combination, a work support, stitching mechanism, and a centering device coacting therewith, said centering device comprising a telescopic member, a laterally movable abutment at one side thereof adapted to aid in registering the opposite ends of a collar, a gripping device, and means for actuating said gripping device on lateral movement of said abutment.

20. In a button hole sewing machine in combination, stitching mechanism, a centering device having a predetermined position with respect to the stitching mechanism, said centering device comprising a plurality of telescopic members, a collar gripping means carried by one of said members, and a pivotally mounted member adapted to be moved about its pivot when determining the center line of the collar to actuate said gripping device.

21. In a button hole sewing machine in combination, a work support, stitching mechanism adapted to coact with the center of a collar and a laterally movable auxiliary gage adapted to aid in registering the opposite ends of said collar, said gage comprising a vertically extending lever movable about an axis parallel to said first member, and means for holding said lever in normal position.

22. In a button hole sewing machine in combination, a work table, stitching mechanism positioned thereabove, start and stop mechanism for the stitching mechanism, a trimmer operatively associated therewith, a work gage adapted to swing in a substantially vertical plane, an actuating lever, and intervening mechanisms between the trimmer and the work gage and said lever.

23. In a button hole sewing machine in combination, a work table, stitching mechanism positioned thereabove, start and stop mechanism for the stitching mechanism, a trimmer operatively associated therewith, a work gage adapted to swing in a substantially vertical plane, controlling mechanism, and intervening mechanism between said controlling mechanism and stop mechanism and the controlling mechanism and said trimmer mechanism.

24. In a button hole sewing machine in combination, a work table, stitching mechanism positioned thereabove, start and stop mechanism for the stitching mechanism, a trimmer operatively associated therewith, a work gage adapted to swing in a substantially vertical plane, a lever, and intervening mechanism between said work gage and lever and between the lever and said start and stop mechanism.

25. In a button hole sewing machine in combination, a table, a frame supporting said table, an auxiliary table positioned thereabove, a stitching mechanism carried by said auxiliary table, a work support adjacent the needle of the stitching mechanisms having a hole through which the needle is adapted to pass, trimmer mechanism associated with said needle, start and stop mechanism for the stitching mechanism, a centering device having a pivotal movement in a vertical plane whereby it moves toward and from a collar placed therebeneath, a lever, intermediate mechanism between the lever and said centering device, and a flexible connection between the lever and the start and stop mechanism whereby said centering device and said start and stop devices are actuated in a predetermined relation.

26. In a button hole sewing machine in combination, a table, a frame supporting said table, an auxiliary table positioned thereabove, a stitching mechanism carried by said auxiliary table, a work support adjacent the needle of the stitching mechanism having a hole through which the needle is adapted to pass, trimmer mechanism associated with said needle, start and stop mechanism for the stitching mechanism, a centering device having a pivotal movement in a vertical plane whereby it moves toward and from a collar placed therebeneath, a foot lever, intermediate mechanism between the foot lever and said centering device, a flexible connection between the lever and the start and stop mechanism whereby said centering device and said start and stop device are actuated with a predetermined relation, said lever being pivotally mounted to swing in opposite directions from a normal intermediate position, a forward and backward movement to one side of said intermediate position controlling the start and stop of the stitching mechanism and a forward and backward movement of the lever at the opposite side of said intermediate position being adapted to control the operation of said trimming mechanism.

27. In a button hole sewing machine in combination, a frame, stitching mechanism, and a centering device associated therewith, stop and start mechanism associated with the stitching device, an actuating lever, and intermediate mechanisms between said start and stop device, the centering device, and lever.

28. In a button hole sewing machine in combination, a frame, stitching mechanism, and a centering device associated therewith, stop and start mechanism associated with the stitching device, an actuating lever, an intermediate mechanism between said start and stop device the centering device and lever, said lever having a normal intermediate position whereby movement to one side will actuate one of said mechanisms and movement of the other side of the intermediate position will actuate the other.

29. In a button hole sewing machine in combination, a frame, stitching mechanism, and a centering device associated therewith, stop and start mechanism associated with the stitching device, an actuating lever, an intermediate mechanism between said start and stop device the centering device and lever, said lever having a normal intermediate position whereby movement to one side will actuate one of said mechanisms and movement the other side of the intermediate position will actuate the other, both of said intervening mechanisms involving loose flexible connecting members whereby one part may be operated independently of and without effect on the other.

30. In a button hole sewing machine in combination, a supporting table, stitching mechanism, stop and start mechanism associated therewith, a centering device, a controlling lever, an intervening mechanism between the centering device and the start and stop mechanism, and said lever whereby said mechanism and centering device may be actuated by a single means, said centering device having a telescopic member, and a gripping device connected with said telescopic member for engaging a collar placed in operative relation thereto, said gripping device adapted to be released from its coactive relation with said collar by actuation of said lever.

31. In a button hole sewing machine in combination, a frame, stitching mechanism, a centering device associated therewith, stop and start mechanism associated with the stitching mechanism, actuating mechanism, intermediate mechanisms between the start and stop device, the centering device, and actuating mechanism, and means to one side of the centering device adapted to aid in registering the opposite ends of the collar when folded about said centering device.

32. In a button hole sewing machine in combination, a frame, stitching mechanism, a slidable centering device associated therewith, a gage pivoted to one side the centering device, and a spring to hold the gage in normal position, said gage being positioned with respect to the centering device to aid in registering the opposite ends of a collar when folded about said centering device.

33. In a button hole sewing machine in combination, a frame, stitching mechanism, a trimmer, stop and start mechanism, a centering device associated therewith, actuating mechanism for controlling the stop and start mechanism, actuating mechanism for controlling the trimmer, manually operated means common to both actuating mechanisms, and a connection between one of the actuating mechanisms to elevate the centering device.

34. In a button hole sewing machine in combination, a frame, stitching mechanism, stop and start mechanism, a centering device, and means for simultaneously operating the starting mechanism and elevating the centering device.

35. In a button hole machine, the combination of stitching mechanism, a gage associated therewith comprising a pivoted member, a sliding member having a collar engaging element, and a trip, a support for holding the gage elevated, the trip being operated when a collar is folded over the gage whereby to remove the gage from the support to cause the collar engaging element to engage a collar, means for starting the stitching mechanism, and actuating means acting simultaneously to start the stitching mechanism and elevate the gage from the collar.

36. In a button hole machine, the combination of stitching mechanism, a movable gage having a sliding element provided with a collar engaging device, and means actuated by folding the collar on the gage to position the collar engaging element to engage the collar preparatory to moving the sliding element and collar toward the stitching mechanism.

37. In a button hole machine, the combination of stitching mechanism, a gage having a trip, a movable gage disposed adjacent the first mentioned gage, a collar being passed around the first mentioned gage and its trip and its ends gaged by the second mentioned gage and moved with the latter to release the trip, and a collar engaging element on the gage which takes hold of the collar when the trip is released.

38. In a button hole sewing machine, the combination of stitching mechanism, a gage automatically placed in set position to convey a collar to the stitching mechanism by engaging a collar therewith, including a sliding element for conveying the collar to the stitching mechanism.

39. In a button hole sewing machine, the combination of stitching mechanism, a gage automatically placed in set position to convey a collar to the stitching mechanism by engaging a collar therewith, including a sliding element for conveying the collar to the stitching mechanism, means for controlling operation of the stitching mechanism, and means for operating the controlling means and removing the gage from the collar when starting the stitching mechanism.

40. In combination, a frame, a buttonhole machine mounted on the frame, a movable gaging device at the forward end of the frame, to gage a collar previous to introducing same to the buttonhole machine, and a collar receptacle at the forward end of the frame below and spaced from the gaging device, said receptacle extending each side the gaging device.

In testimony whereof I have signed my name to this specification in the presence of two subscribing witnesses.

HENRY C. MILLER.

Witnesses:
 JNO. IMIRIE,
 ALEXANDER PARK.

Copies of this patent may be obtained for five cents each, by addressing the "Commissioner of Patents, Washington, D. C."